US012681618B2

(12) United States Patent
Messingher Lang et al.

(10) Patent No.: US 12,681,618 B2
(45) Date of Patent: Jul. 14, 2026

(54) REMOTE DEVICE INPUT ENTRY

(71) Applicant: Apple Inc., Cupertino, CA (US)

(72) Inventors: Shai Messingher Lang, Santa Clara, CA (US); Julian K. Shutzberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 18/381,727

(22) Filed: Oct. 19, 2023

(65) Prior Publication Data

US 2024/0143125 A1 May 2, 2024

Related U.S. Application Data

(60) Provisional application No. 63/421,356, filed on Nov. 1, 2022.

(51) Int. Cl.
| | |
|---|---|
| *G06F 3/04815* | (2022.01) |
| *G06F 3/01* | (2006.01) |
| *G06F 3/0487* | (2013.01) |
| *G06F 3/14* | (2006.01) |

(52) U.S. Cl.
CPC .......... *G06F 3/04815* (2013.01); *G06F 3/013* (2013.01); *G06F 3/0487* (2013.01); *G06F 3/1423* (2013.01)

(58) Field of Classification Search
CPC .... G06F 3/04815; G06F 3/013; G06F 3/0487; G06F 3/1423; G06F 3/011
USPC ........................................................ 715/740
See application file for complete search history.

(56) References Cited

U.S. PATENT DOCUMENTS

| | | | |
|---|---|---|---|
| 2015/0277699 A1 | 10/2015 | Algreatly | |
| 2017/0160812 A1 | 6/2017 | Park et al. | |
| 2017/0308258 A1 * | 10/2017 | Xu | G06F 13/14 |
| 2017/0315721 A1 * | 11/2017 | Merel | G06F 3/04883 |
| 2018/0150204 A1 * | 5/2018 | Macgillivray | G06F 3/04815 |
| 2018/0173323 A1 * | 6/2018 | Harvey | G06F 3/011 |
| 2020/0013221 A1 | 1/2020 | Woo | |
| 2020/0193938 A1 * | 6/2020 | Estruch Tena | G02B 27/0172 |
| 2020/0244944 A1 * | 7/2020 | Xin | G06F 40/10 |
| 2021/0194942 A1 * | 6/2021 | Kane | G06F 3/017 |
| 2022/0207816 A1 * | 6/2022 | Marra | G06F 3/013 |

* cited by examiner

*Primary Examiner* — Stephen S Hong
*Assistant Examiner* — Broderick C Anderson
(74) *Attorney, Agent, or Firm* — Thompson Hine LLP

(57) ABSTRACT

Devices, systems, and methods that provide an improved remote device user interface for enabling accurate text input into a user device may be provided. For example, a user device (e.g., an HMD) may be enabled to receive touch-screen input via input controls displayed by a remote device (e.g., a mobile phone, a tablet computer, etc.) using a display mode enhanced for pass-through viewing. For example, an enhanced display mode may enable a larger than normal display to enhance display mode attributes associated with input entry with respect to the user device. In some implementations display mode attributes may be enabled based on context such as distance, lens distortion, lighting, minimum character resolution, etc. Likewise, some implementations may augment input controls (on an HMD) such as 3 dimensional bubbles, auto-correct controls, auto-fill controls, spatialized audio controls, virtual touch/function bar controls, etc.

24 Claims, 7 Drawing Sheets

200a

200b

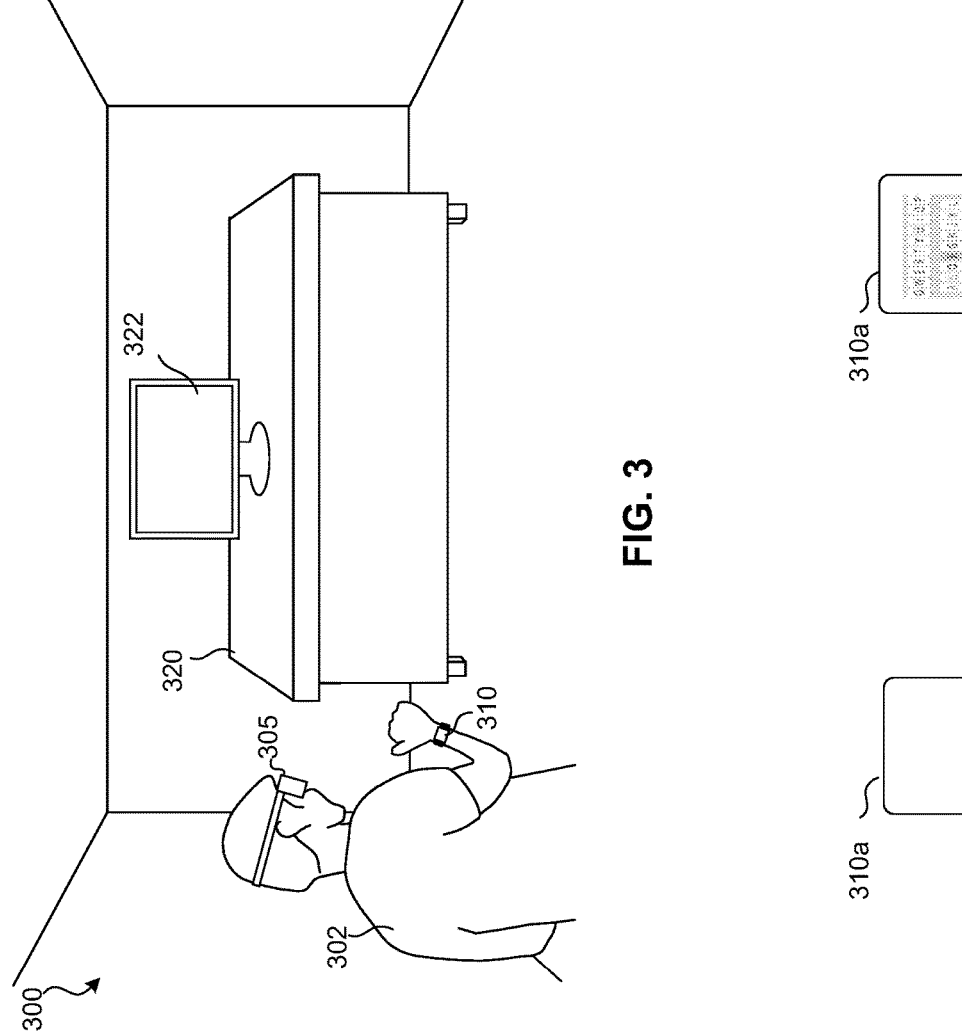
FIG. 3
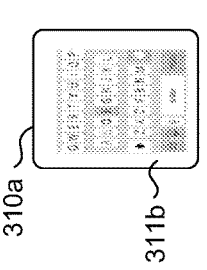
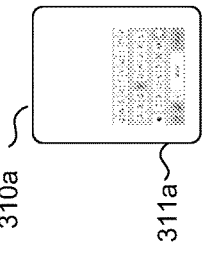
FIG. 4

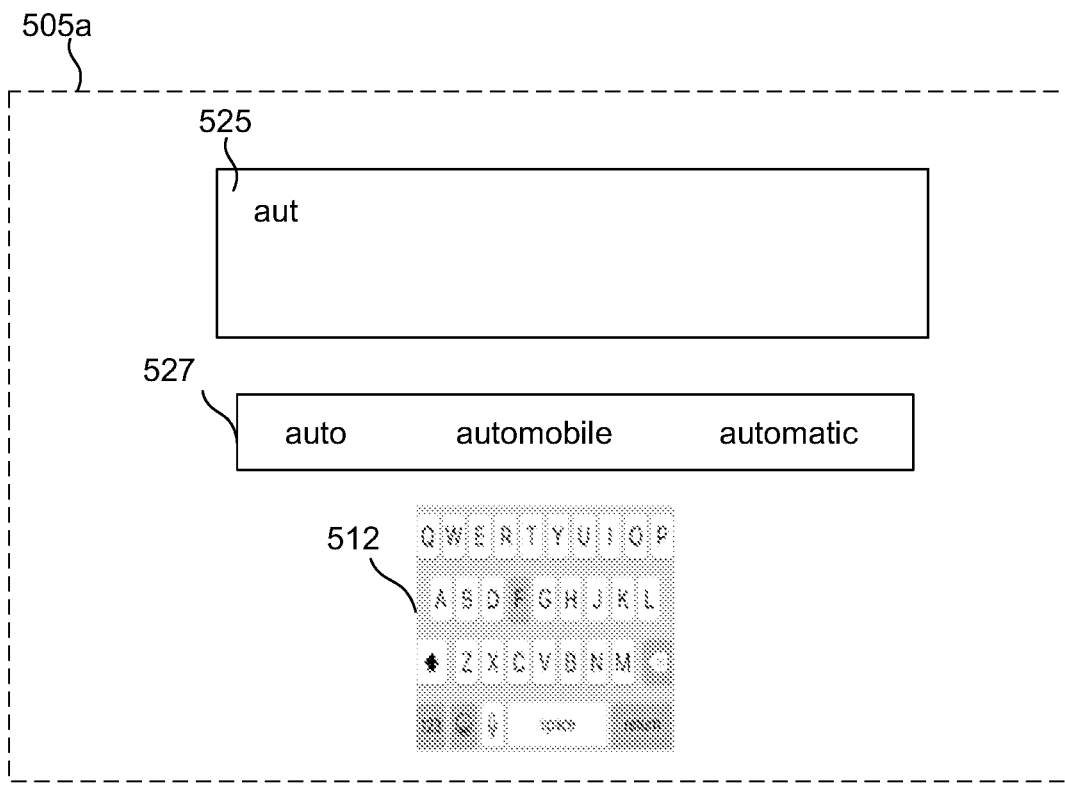
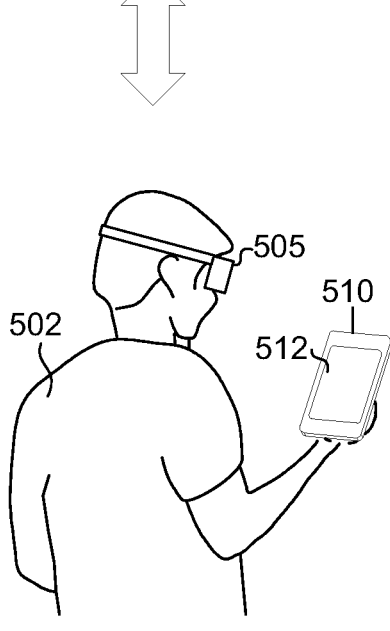
FIG. 5

600

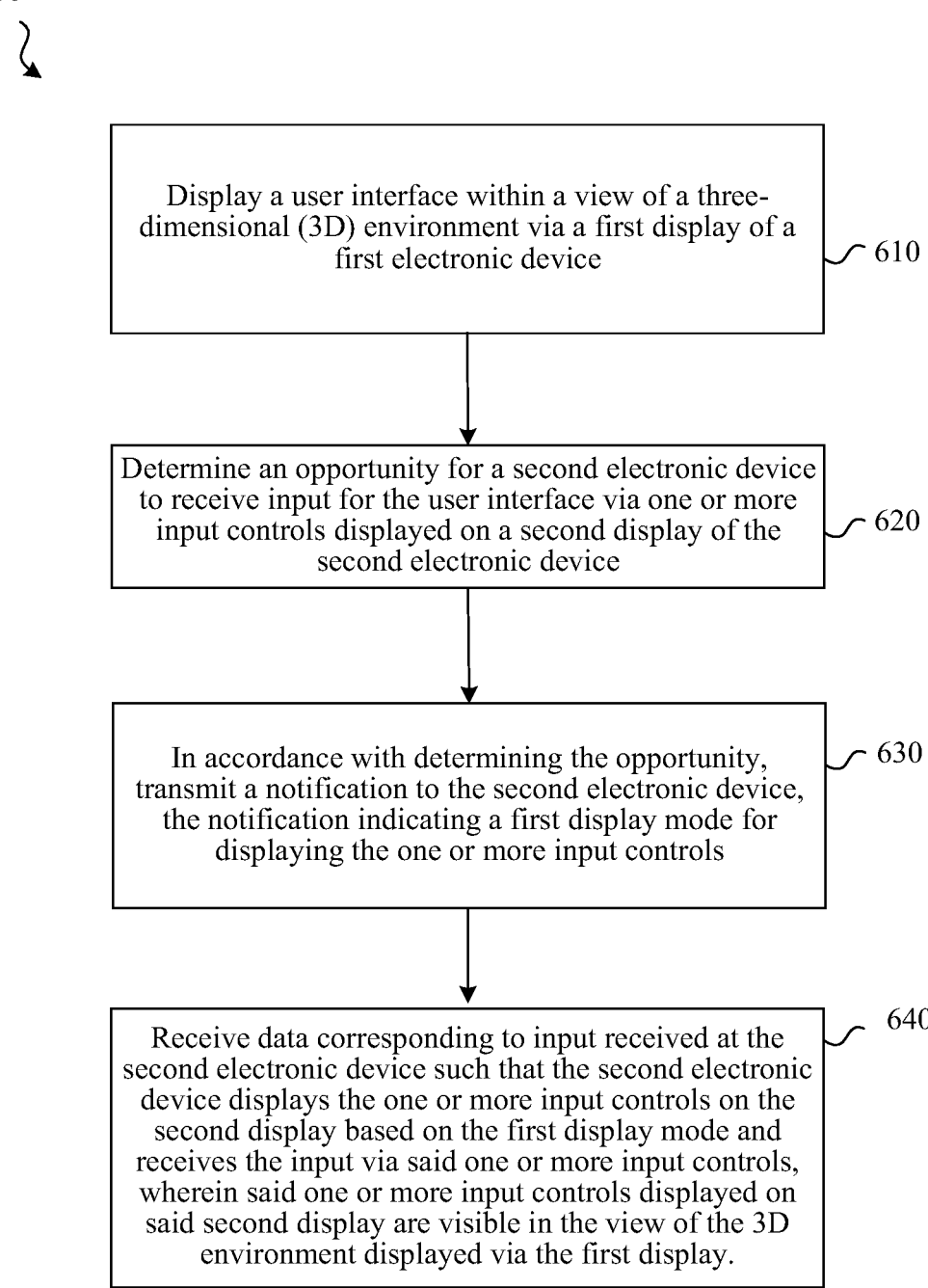

Display a user interface within a view of a three-dimensional (3D) environment via a first display of a first electronic device ⎯ 610

Determine an opportunity for a second electronic device to receive input for the user interface via one or more input controls displayed on a second display of the second electronic device ⎯ 620

In accordance with determining the opportunity, transmit a notification to the second electronic device, the notification indicating a first display mode for displaying the one or more input controls ⎯ 630

Receive data corresponding to input received at the second electronic device such that the second electronic device displays the one or more input controls on the second display based on the first display mode and receives the input via said one or more input controls, wherein said one or more input controls displayed on said second display are visible in the view of the 3D environment displayed via the first display. ⎯ 640

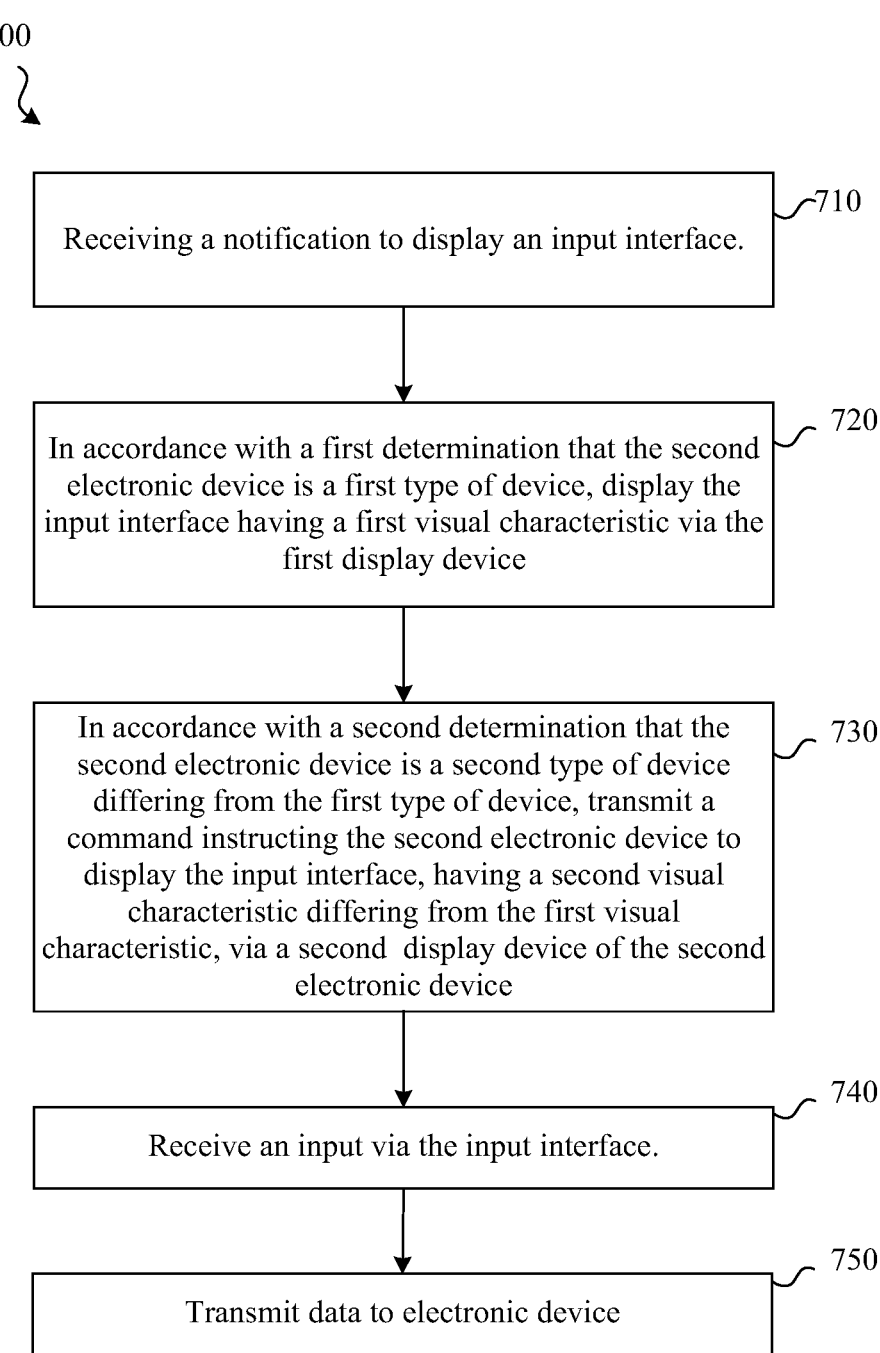

710

Receiving a notification to display an input interface.

720

In accordance with a first determination that the second electronic device is a first type of device, display the input interface having a first visual characteristic via the first display device

730

In accordance with a second determination that the second electronic device is a second type of device differing from the first type of device, transmit a command instructing the second electronic device to display the input interface, having a second visual characteristic differing from the first visual characteristic, via a second display device of the second electronic device

740

Receive an input via the input interface.

750

Transmit data to electronic device

FIG. 7

Device 800

REMOTE DEVICE INPUT ENTRY

CROSS-REFERENCE TO RELATED APPLICATIONS

This application claims the benefit of U.S. Provisional Application Ser. No. 63/421,356 filed Nov. 1, 2022, which is incorporated herein in its entirety.

TECHNICAL FIELD

The present disclosure generally relates to systems, methods, and devices such as head-mounted devices (HMDs) that receive touchscreen input via input controls displayed by remote devices.

BACKGROUND

To enable user input to devices such as HMDs, it may be desirable to enable a user to provide input via a separate device, such as a touch screen of a separate mobile device. However, existing systems may not adequately enable such input, for example, because such systems may not provide adequate views of the user interfaces provided by such separate devices, e.g., pass-through video of such user interfaces may lack resolution, clarity, or other display capabilities sufficient for users to see or use the displayed user interface elements of those separate devices.

SUMMARY

Various implementations disclosed herein include devices, systems, and methods that provide improved remote device input entry for devices such as HMDs. For example, a user device (e.g., an HMD) may be enabled to receive touchscreen input via input controls displayed by a remote device (e.g., a mobile phone, a tablet computer, etc.), where the remote device uses a display mode enhanced for pass-through viewing on the user device. An enhanced display mode may utilize the remote device's standard input features (e.g., standard touch-screen keyboard) enhanced with selected display mode attributes (e.g., enhanced element sizing, contrast, brightness, etc.) to facilitate improved visibility or easier use by a user viewing that user interface via the user's device, e.g., via pass-through video on an HMD. For example, a mobile device's standard touch-based keyboard may be altered to have attributes enhanced for viewing and use by a user viewing that user interface via an HMD's pass-through video. In some implementations, display mode attributes may be selected based on context such as distance, lens distortion, lighting, minimum character resolution, etc.

Some implementations may augment the view of the remote device's input controls by providing associated user interface content, e.g., three dimensional (3D) bubbles, auto-correct controls, auto-fill controls, spatialized audio controls, virtual touch/function bar controls, etc., located proximate or otherwise presented in a way indicative of an association with the viewed remote device user interface. For example, an HMD may display a view that includes both (a) a depiction of a mobile device including a keyboard displayed on the mobile device's touch screen and (b) a virtual function key bar located just above that displayed remote device such that the HMD user can interact with the mobile device-displayed keyboard or the HMD-displayed virtual function key bar, or both to provide input that is received and used by the HMD.

In some implementations, a first electronic device has a first display and a processor (e.g., one or more processors) that executes instructions stored in a non-transitory computer-readable medium to perform a method. The method performs one or more steps or processes. In some implementations, the first electronic device displays a user interface within a view of a three-dimensional (3D) environment via the first display. The view of the 3D environment may include or be based upon pass-through video of a physical environment. The first electronic device determines an opportunity for a second electronic device to receive input for the user interface via one or more input controls displayed on a second display of the second electronic device. In accordance with determining the opportunity, the first electronic device transmits a notification to the second electronic device. The notification indicates (explicitly or implicitly) a first display mode for displaying the one or more input controls. The second electronic device displays the one or more input controls on the second display based on the first display mode and the one or more input controls displayed on the second display are visible in the view of the 3D environment displayed via the first display, e.g., in the view provided that includes or is based upon pass-through video of the physical environment. The second electronic device receives the input via the one or more input controls and data corresponding to the input is provided to and received at the first electronic device, which may respond accordingly.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is an example physical environment in which a watch device and an HMD device may operate, in accordance with some implementations.

FIG. 4 illustrates modification of input controls on a watch device to improve pass-through viewing of the input controls provided by the HMD of FIG. 1, in accordance with some implementations.

FIG. 5 illustrates an HMD view of the modified input controls and generated augmentations, in accordance with some implementations.

FIG. 6 is a flowchart representation of an exemplary method for modifying input controls from an HMD point of view, in accordance with some implementations.

FIG. 7 is a flowchart representation of an exemplary method for modifying input controls from a mobile device point of view, in accordance with some implementations.

Figure 1:
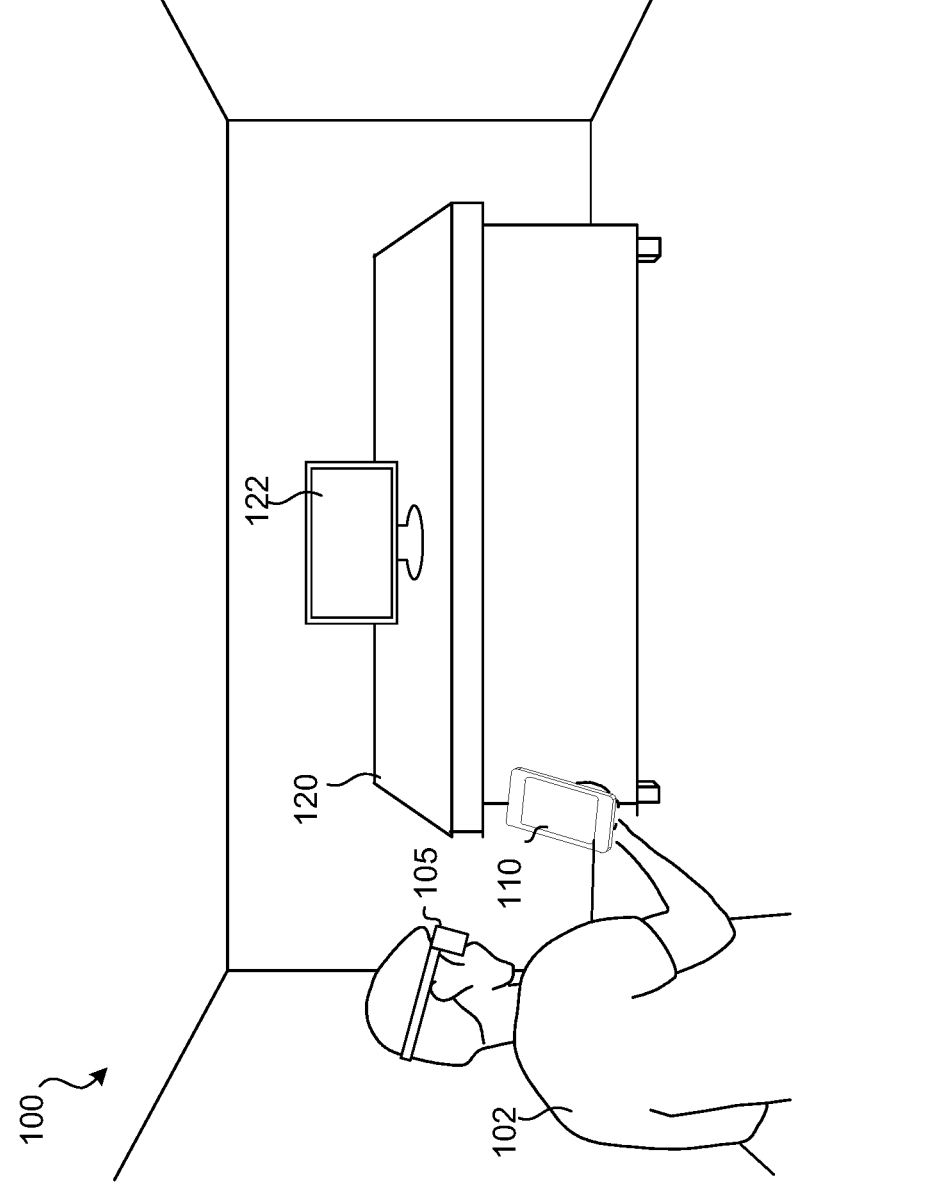
FIG. 1 is an example physical environment in which a mobile device and an HMD device may operate, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates a block diagram view of an example physical environment 100 including an HMD 105 and a mobile device 110. The mobile device 110 may include any type of mobile device including, inter alia, a smart phone, a tablet computer, etc. The HMD 105 is configured to provide pass-through video views of the physical environment 100, including video that includes image frames having depictions of mobile device 110, input controls, and content displayed thereon. In this example, physical environment 100 also includes a desk 120 and a monitor 122.

The HMD 105 is configured to receive touchscreen input via input controls displayed by the mobile device 110 by enabling a display mode enhanced for pass-through viewing. As non-limiting examples, a keyboard, a keypad, a color-picker, an emoji-picker, a slider bar, a timeline, or a signature block input may be displayed using a larger than normal display mode to improve visibility of the input controls while wearing the HMD 105. Display mode attributes may be enabled based on context such as, inter alia, device distance, lens distortion, lighting attributes, a minimum character resolution, etc. The input controls displayed on the HMD 105 may be augmented with the following exemplary and non-limiting augmentations: 3D information bubbles, auto-correct/auto-fill augmentations, spatialized audio augmentations, a virtual touch/function bar augmentation, etc. A display of the mobile device may be enabled/triggered based on context such as, inter alia, an open text entry window, a user gazing at the mobile device 110, a distance of the mobile device 110 from the user 102 or the HMD 105, etc.

The HMD 105 and/or mobile device 110 may include one or more cameras, microphones, depth sensors, or other sensors that can be used to capture information about and evaluate the physical environments 100 and the objects therein, as well as information about a user 102. The HMD

105 and mobile device 110 may use information about the physical environment 100 or user 102 that obtained from the sensors to provide visual and audio content.

In some implementations, the HMD 105 is configured to present views that it generates to the user 102, including views that may be based on the physical environment 100. According to some implementations, the HMD 105 generates and presents views of an extended reality (XR) environment. In some implementations, the HMD 105 may be replaced with a handheld electronic device (e.g., a smartphone or a tablet). The HMD 105 may include one or more displays provided to display content, e.g., one display for each eye. The HMD 105 may enclose the field-of-view of the user 102. In some implementations, the functionalities of HMD 105 are provided by more than one device. In some implementations, the HMD 105 communicates with a separate controller or server to manage and coordinate an experience for the user. Such a controller or server may be local or remote relative to the physical environment 100.

A device, such as HMD 105, may have a visual acuity that is less than a user's acuity. Thus, for example, while the user 102 may be able to see with 20/20 acuity, the device may have a 20/35 acuity in its central region at the peak focal distance. Thus, a user's view of pass-through video may be less clear or otherwise different than the view the user 102 would see viewing the surrounding physical environment without the HMD 105. This difference can be significant when viewing the physical environment 100 via the device, e.g., as pass-through video on HMD 105, especially with respect to input controls (e.g., a keyboard, a keypad, etc.) for which clarity improves readability, understandability, or other aspects associated with entering accurate input data. For example, user 102 may find it difficult to enter text using a default text-entry virtual keyboard displayed on mobile device 110 in pass-through video provided by HMD 105. For example, when holding the mobile device 110 at a typical distance/position for reading, e.g., at the distance the user 102 would use when not wearing HMD 105, the default input control sizes (e.g., a size of alpha numeric keys of a keyboard) may be illegible. This might encourage the user to hold the mobile device 110 closer than usual to their eyes, which may be uncomfortable or undesirable.

In some implementations, the mobile device 110 provides a display mode for modifying the input controls without necessarily requiring the user 102 to hold the mobile device 110 closer than normal. The mobile device 110 may do so, for example, by changing the appearance of its input controls, e.g., increasing a keyboard size (e.g., to cover more of or the entire display area of the mobile device 110, etc.), changing input control color, changing input control contrast, bolding the input controls, adjusting transparency of the input controls, enabling accessibility features, etc. The altered input controls may be configured to provide more accurate viewing when viewed via pass-through video on HMD 105. In some implementations, the altered input controls are displayed initially, e.g., as soon as the input controls are to be first displayed on the mobile device 110, and thus are not initially displayed on the mobile device 110 in their "original" unaltered form. In some implementations, the input controls on the mobile device 110 are altered (e.g., from its original to its altered form) and thus the original form of the input controls may be transitioned to the altered form. Such a transition may occur based on determining that the content is being viewed via an HMD's pass-through video or other criteria.

Figure 2:
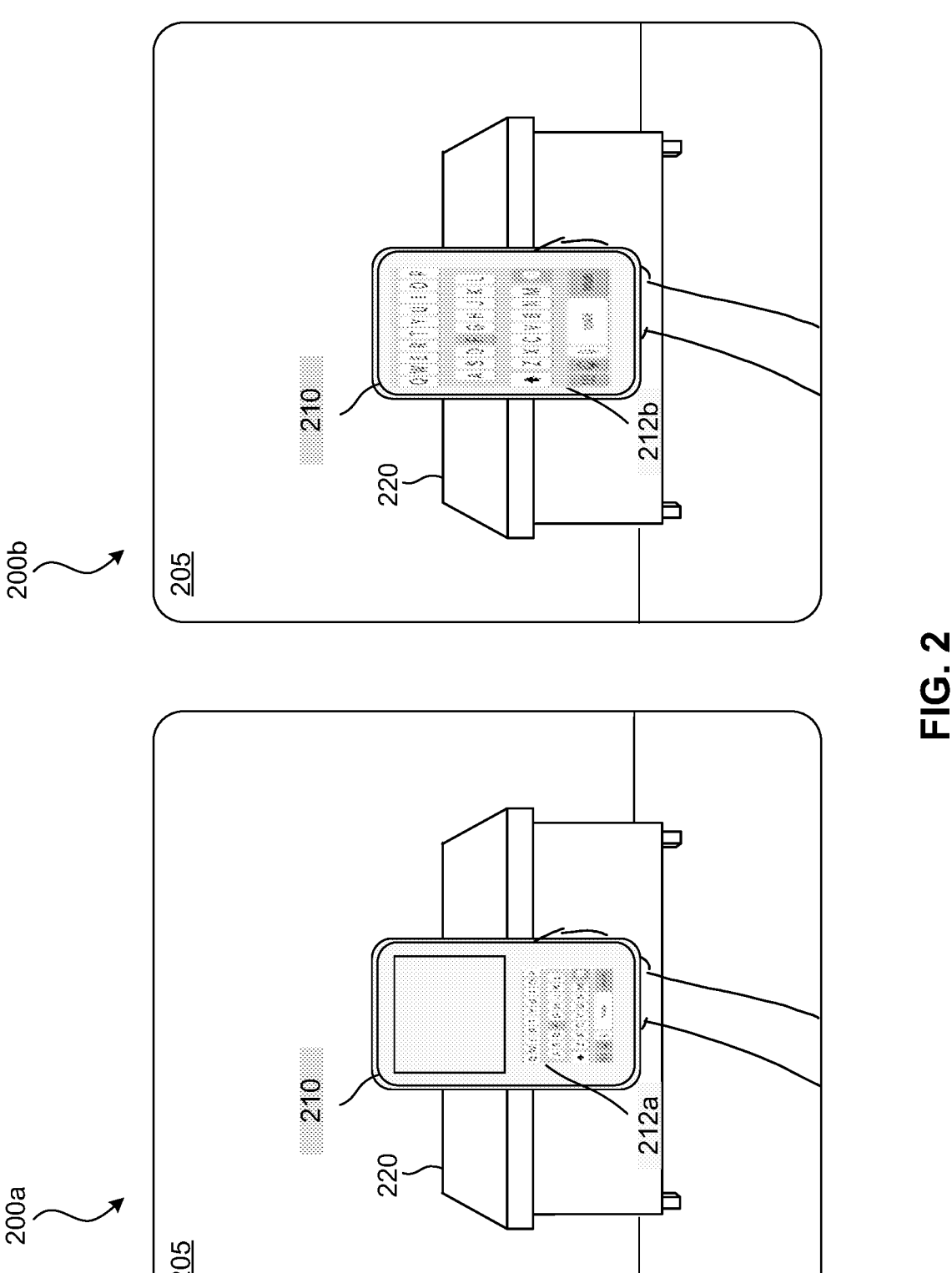
FIG. 2 illustrates modification of input controls on a mobile device to improve pass-through viewing of the input controls provided by the HMD of FIG. 1, in accordance with some implementations.

FIG. 2 illustrates a view for modifying input control attributes on the mobile device 110 to improve a passthrough video view provided by the HMD 105 (of FIG. 1). In this example, a view 200*a* is a view of pass-through video of physical environment 100 provided by HMD 105. The view 200*a* includes a depiction 210 of the mobile device 110, a depiction 212*a* of input controls being displayed on the mobile device 110, and a depiction 220 of the desk 120. FIG. 2 illustrates the depiction 212*a* of the input controls (e.g., a keyboard) as being relatively small and thus being too small to read or use given the acuity provided by the HMD 105. In contrast, the view 200*b* is a view of pass-through video of physical environment 100 provided by HMD 105 where the input controls being displayed are using an enhanced display mode by device 110. The view 200*b* includes a depiction 210 of the mobile device 110, a depiction 212*b* of the input controls being displayed on the mobile device 110, and a depiction 220 of the desk 120. FIG. 2 shows the depiction 212*b* of the input controls as being relatively larger and thus enabling accurate input entry.

In some implementations, an enhanced display mode is triggered manually, e.g., based on user input. In some implementations, such an enhanced display mode is triggered automatically based on one or more criteria. For example, an enhanced display mode may be automatically triggered based on detecting that the user 102 is looking at a depiction of the mobile device 110 in a view provided by the HMD 105. The HMD 105, in this example, may track the user's gaze using eye-facing cameras or other sensors to determine when a user's gaze direction is directed towards such a depiction. Gaze data may be interpreted to distinguish non-intentional gazes (e.g., non-intentional saccades, etc.) from gazes made intentionally at the mobile device 110 or the content thereon. In this example, the HMD 105 may determine that the user is looking at the mobile device 110 or its content and send a message or request to the mobile device 110 to initiate or otherwise cause the mobile device 110 to switch its content display to the enhanced display mode. In some implementations, the HMD 105 may determine that the device 110 is within a field of vision of HMD 105 and send a message or request to the mobile device 110 to initiate or otherwise cause the mobile device 110 to switch its content display to the enhanced display mode.

In some implementations, an enhanced display mode for an input element (e.g., a virtual keyboard on a mobile device) is triggered based on determining that the HMD 105 is in a state associated with receiving input of a corresponding type (e.g., a text dialog box is currently open, active, etc. in the view provided by the HMD 105). In one example, when the HMD 105 detects that a new text-receiving element has been added to the HMD's view (e.g., the user has opened a text-entry window, etc. on the HMD's user interface), the HMD 105 determines whether there are any remote devices available to facilitate the corresponding input type and, if so, initiates a notification to such devices regarding receiving input via an input element provided by such a remote device 110. The notification may indicate that an enhanced display mode should be used to present the input element, e.g., that a virtual keyboard should be displayed with enhanced size, enhanced brightness, or other enhanced characteristics. The remote device 110 may automatically initiate the display of the input element according to the enhanced display mode or provide an option for the user to initiate the input element (in the enhanced display mode).

In another example, an enhanced display mode is automatically triggered additionally, or alternatively, based upon one or both of the mobile device 110 and HMD 105 being within a threshold distance of one another. Sensors on either device may determine such distances, e.g., using depth sensor measurements, interpreting image data, detecting wireless signal strength, or using other sensor data. For example, if the HMD 105 determines that the mobile device 110 is within the threshold it may send a message to the mobile device 110 notifying the mobile device 110 of this circumstance.

Similarly, the enhanced display mode may automatically be triggered additionally, or alternatively, based on determining that a user 102 is both wearing the HMD 105 and interacting with the mobile device 110 at the same time, e.g., by providing touch input on a touch surface of the mobile device 110. For example, the HMD 105 may use images or other sensor data to determine that a hand of a user of the HMD is interacting with another device, identify that device, and send a communication to that device (e.g., mobile device 110) of this circumstance.

The optimized display mode may automatically be triggered additionally, or alternatively, based on determining that the respective orientations of the mobile device 110 and HMD 105 are facing one another or are otherwise oriented in a way that is indicative of the HMD user being able to see or use the input controls of the mobile device 110. Such orientations may be determined based on sensor data of one or both devices, e.g., image data from cameras, motion tracking data from accelerometers, gyroscopes, etc., depth data from depth sensors, etc. Such orientations may be determined based on information provided using ultrawide band radios. In some implementations, inter-device communication are used to confirm orientation. For example, the HMD 105 may determine that there is a device oriented toward it a few feet in front of the HMD 105. The HMD may ping one or more nearby devices with which it has an association (e.g., same user, same account, devices of known contacts, etc.) and ask those one or more nearby devices to confirm which of those devices (if any) is the one that is oriented towards it or whether the user of the HMD 105 is looking at any of those devices. The mobile device 110 may confirm its orientation or that the user of the HMD 105 is looking at it. In one example, the mobile device 110 has an infrared camera that periodically (e.g., every 18 seconds) captures data to determine whether a user is looking at it for power saving purposes (e.g., to go into sleep mode if the user is not looking at it) and this sensing capability is additionally or alternatively used to determine if and when a user of the HMD 105 is looking at the mobile device 110.

The triggering of an enhanced display mode may be based on determining that there are one or more persons who are in the physical environment 100 other than the user of the HMD 105. For example, the enhanced display mode may only be triggered if both devices (e.g., HMD 105 and tablet mobile device 110) are associated with the same person, account, or organization, and that the user is the only user in the physical environment, within a threshold distance (e.g., 5 feet of the mobile device 110), etc. In another example, the enhanced display mode may additionally or alternatively be triggered based on determining that the user 102 of HMD 105 is authorized to view the content being displayed by mobile device 110. In another example, the enhanced display mode (e.g., larger input controls) may not be triggered to ensure privacy in certain situations, e.g., when there are other people nearby that may see the input entry.

It may be desirable to only trigger the enhanced display mode in circumstances based on determining a type of environment or particular location. For example, the enhanced display mode may only be triggered if the physical environment 100 is a private (e.g., non-public) environment such as the user's home, office, etc. In another example, the enhanced display mode (e.g., larger input controls) may not be triggered based on determining that the physical environment 100 is a public elevator, a plane, a bus, a train, a hotel lobby, a coffee shop, etc.

In some implementations, the HMD 105 and tablet device 110 communicate with one another to share information that facilitates the switching of the mobile device 110 into an enhanced display mode for input in certain circumstances. Such communications may be facilitated based on the devices being part of the same ecosystem/brand of devices and/or being associated with a same user account. In some implementations, the inter-device communications share acuity-related information. For example, the HMD 105 may notify the mobile device 110 its acuity is 20:35 or request that the tablet device switch to an enhanced display mode in certain circumstances. The HMD 105 may share information with the mobile device 110 indicating that a possible circumstance for an enhanced display mode is occurring and that the mobile device 110 should switch to the comfortable viewing mode.

In some implementations, the mobile device 110 is configured to determine whether to switch to an enhanced display mode for input based on the device that is providing a pass-through view of its content and the characteristics (e.g., acuity) of that pass-through device. Thus, for example, the HMD 105 may send its acuity to the mobile device 110 and then the mobile device 110 may switch to the enhanced display mode whenever the mobile device 110 further detects appropriate criteria are satisfied, e.g., when one of the devices determines the devices are within a threshold distance, the HMD 105 determines that the user 102 is looking at the mobile device 110, either device determines that the devices are orientated towards one another, either device determines that the view of the input controls would be unlikely to be accurately viewed in the current circumstances, etc.

FIG. 3 is an example physical environment 300 in which a watch device 310 and an HMD 305 may operate. The HMD 305 is configured to provide pass-through video views of the physical environment 300, including video that includes depictions of watch device 310 and content displayed thereon. In this example, physical environment 300 also includes a desk 320 and a monitor 322.

The HMD 305 and/or watch device 310 may include one or more cameras, microphones, depth sensors, or other sensors that can be used to capture information about and evaluate the physical environments 300 and the objects therein, as well as information about the user 302. The HMD 305 and watch device 310 may use information about the physical environment 300 or user 302 that is obtained from the sensors to provide visual and audio content.

In some implementations, the HMD 305 is configured to present views that it generates to the user 302, including views that may be based on the physical environment 300. According to some implementations, the HMD 305 generates and presents views of an extended reality (XR) environment. In some implementations, the HMD 305 is instead a handheld electronic device (e.g., a smartphone or a tablet). The HMD 305 may include one or more displays provided to display content, e.g., a display for each eye. The HMD 305 may enclose the field-of-view of the user 302. In some implementations, the functionalities of HMD 305 are provided by more than one device. In some implementations, the HMD 305 communicates with a separate controller or server to manage and coordinate an experience for the user.

Such a controller or server may be local or remote relative to the physical environment 300.

In some implementations, the watch device 310 provides an enhanced display mode by changing the appearance of its contents, e.g., increasing a keyboard size (e.g., to cover an entire display area of the watch device 310, etc.). The altered content provides more enhanced/customized viewing when viewed via pass-through video on HMD 305.

FIG. 4 illustrates a graphical view for modifying input control attributes on the watch device 310 (of FIG. 3) to improve a pass-through video view provided by the HMD 305. In this example, a view 400a is a view of pass-through video of physical environment 300 provided by HMD 305. The view 400a includes a depiction 410 of the watch device 310, a depiction 412a of input controls being displayed on the watch device 310. FIG. 4 illustrates the depiction 412a of the input controls (e.g., a keyboard) as being relatively small and thus being too small to read given the acuity provided by the HMD 305. In contrast, the view 400b is a view of pass-through video of physical environment 300 provided by HMD 305 where the input controls are being displayed using an enhanced display mode by watch device 310. The view 400b includes a depiction 410 of the watch device 310 and a depiction 412b of the input controls being displayed on the watch device 310. FIG. 4 shows the depiction 412b of the input controls as being relatively larger and thus enabling accurate input entry.

FIG. 5 illustrates an HMD view 505a of the mobile device 510 with modified (e.g., increased in size) input controls 512 (of a mobile device 510 of a user 502) and generated augmentations 525 and 527 provided by HMD 505. The generated augmentations 525 comprise text entry field augmentations. The generated augmentations 527 comprise auto-fill augmentations. For example, user 502 initiates a typing sequence (presented to user 502 in text entry field augmentations (e.g., generated augmentations 525) that include the letters "aut". In response, generated augmentations 527 (e.g., comprising auto-fill term suggestions including the terms "auto", "automobile", and "automatic") are presented to user 502 (for user selection) via a generated augmentation field. Alternatively, generated augmentations may include, inter alai, 3D information bubbles, auto-correct/auto-fill augmentations, spatialized audio augmentations, a virtual touch/function bar augmentation, etc.

FIG. 6 is a flowchart representation of an exemplary method 600 for modifying input controls from an HMD point of view. In some implementations, the method 600 is performed by a first electronic device (e.g., HMD 105 of FIG. 1) having a processor and a first display. In some implementations, the method 600 is performed by processing logic, including hardware, firmware, software, or a combination thereof. In some implementations, the method 600 is performed by a processor executing code stored in a non-transitory computer-readable medium (e.g., a memory). Each of the blocks in the method 600 may be enabled and executed in any order.

At block 610, the method 600 displays a user interface within a view of a three-dimensional (3D) environment (e.g., an XR environment) via the first display. The 3D environment is generated based at least in part on pass-through video of a physical environment as described with respect to FIGS. 2-5.

At block 620, the method 600 determines an opportunity for a second electronic device (e.g., a mobile device) to receive input for the user interface via one or more input controls displayed on a second display of the second electronic device. Such an opportunity may be determined based on content displayed by the first device, e.g., whether there are input elements being displayed that require input of a type corresponding to an input element available via the second electronic device. Such an opportunity may be determined based on the proximity, orientations, or other attributes of the second electronic device or the environment.

At block 630, in accordance with determining the opportunity (of block 620), the method 600 transmits a notification to the second electronic device. The notification indicates (explicitly or implicitly) a first display mode (e.g., a pass-through mode, an enhanced mode, an enlarged input interface mode, etc.) for displaying the one or more input controls.

At block 640, data corresponding to input received at the second electronic device is received. In response, the second electronic device displays the one or more input controls on the second display based on the first display mode and receives the input via the one or more input controls. The one or more input controls displayed on the second display are visible in the view of the 3D environment displayed via the first display as described with respect to FIGS. 2-5.

In some implementations, the first display mode (e.g., a pass-through enhanced display mode) differs from a second display mode (e.g., normal/non-pass-through display mode) available on the second device. For example, the first display mode may correspond to viewing the second display via pass-through video and the second display mode may correspond to viewing the second display directly.

In some implementations, a position of the second electronic device is determined within in the 3D environment and associated augmented content is provided. The augmented content is associated with the one or more input controls in the view of the 3D environment based on the position of the second electronic device. Alternatively, a predetermined layout of the one or more input controls may be detected with respect to the second electronic device in the 3D environment and augmented content may be provided based on the predetermined layout as described with respect to FIG. 5.

The augmented content may include a 3D representation corresponding to one of the input controls. For example, the augmented content may include a popup bubble of a specified character being enabled. As a first alternative the augmented content may include a 3D representation of auto-correct content, auto-fill content, or a virtual key touch bar. As a second alternative, the augmented content may include spatialized audio corresponding to input events on the second display.

In some implementations, determining the opportunity (of block 620) may include determining that the user interface comprises content associated with an input modality such as, inter alia, a keyboard input modality. Alternatively, determining the opportunity may include determining a gaze corresponding to an element of the user interface or the second electronic device. The element of the user interface may be associated with an input modality. Likewise determining the opportunity may include determining a distance of the second electronic device relative to the first electronic device.

In some implementations, the first display mode may include a size attribute (e.g., large) for the one or more input controls. The size attribute may include a minimum size attribute based on a characteristic of the first electronic device. The characteristic may include a quality pass-through video or a lens distortion of the HMD. The first display mode may be determined based on a distance of the second electronic device relative to the first electronic device. Likewise, the first display mode may provide a minimum character size or minimum character resolution. Alternatively, the first display mode may be generated based on a lighting of the physical environment.

In some implementations, the second electronic device automatically displays the one or more input controls in response to the notification (transmitted at block 630). Alternatively, the second electronic device may display a selectable element (e.g., a user may select to use mobile device as input) based on the notification. In response, the one or more input controls may be displayed based on selection of the element.

FIG. 7 is a flowchart representation of an exemplary method 700 for modifying input controls from a mobile device point of view. In some implementations, the method 700 is performed by a first electronic device (e.g., mobile device 110 of FIG. 1) having a processor and a first display. In some implementations, the method 700 is performed by processing logic, including hardware, firmware, software, or a combination thereof. In some implementations, the method 700 is performed by a processor executing code stored in a non-transitory computer-readable medium (e.g., a memory). Each of the blocks in the method 700 may be enabled and executed in any order.

At block 710, the method 700 receives (from a second electronic device such as an HMD, a video streaming device, etc.) a notification to display an input interface. At block 720, in accordance with a first determination that the second electronic device is a first type of device (and based on the notification), the input interface is displayed (via the first display device) with respect to a first visual characteristic (e.g., a size characteristic, a contrast characteristic, a color characteristic, a layout characteristic, etc.). At block 730, in accordance with a second determination that the second electronic device is a second type of device differing from the first type of device (and based on the notification), a command is transmitted to the second electronic device. The command instructs the second electronic device to display (via a second display device of the second electronic device) a view of the input interface having a second visual characteristic (e.g., size, contrast, color, layout, etc.) differing from the first visual characteristic. In block 740, input (e.g., text) is received via the input interface. In block 750, data, corresponding to the input is transmitted to the second electronic device.

In some implementations, a first display mode (e.g., normal/non-pass-through display mode) available on the first electronic device differs from a second display mode (e.g., a pass-through enhanced display mode) available on the second electronic device. For example, the first display mode may correspond to viewing the second display directly and the second display mode may correspond to viewing the first display via pass-through video.

In some implementations, the second display mode may include a size attribute (e.g., large) for the one or more input controls. The size attribute may include a minimum size attribute based on a characteristic of the first electronic device. The second display mode may be determined based on a distance of the first electronic device relative to the second electronic device. Likewise, the second display mode may provide a minimum character size or minimum character resolution. Alternatively, the second display mode may be generated based on a lighting of the physical environment.

In some implementations, the first electronic device automatically displays the one or more input controls in response to the notification (of block 710).

Figure 8:
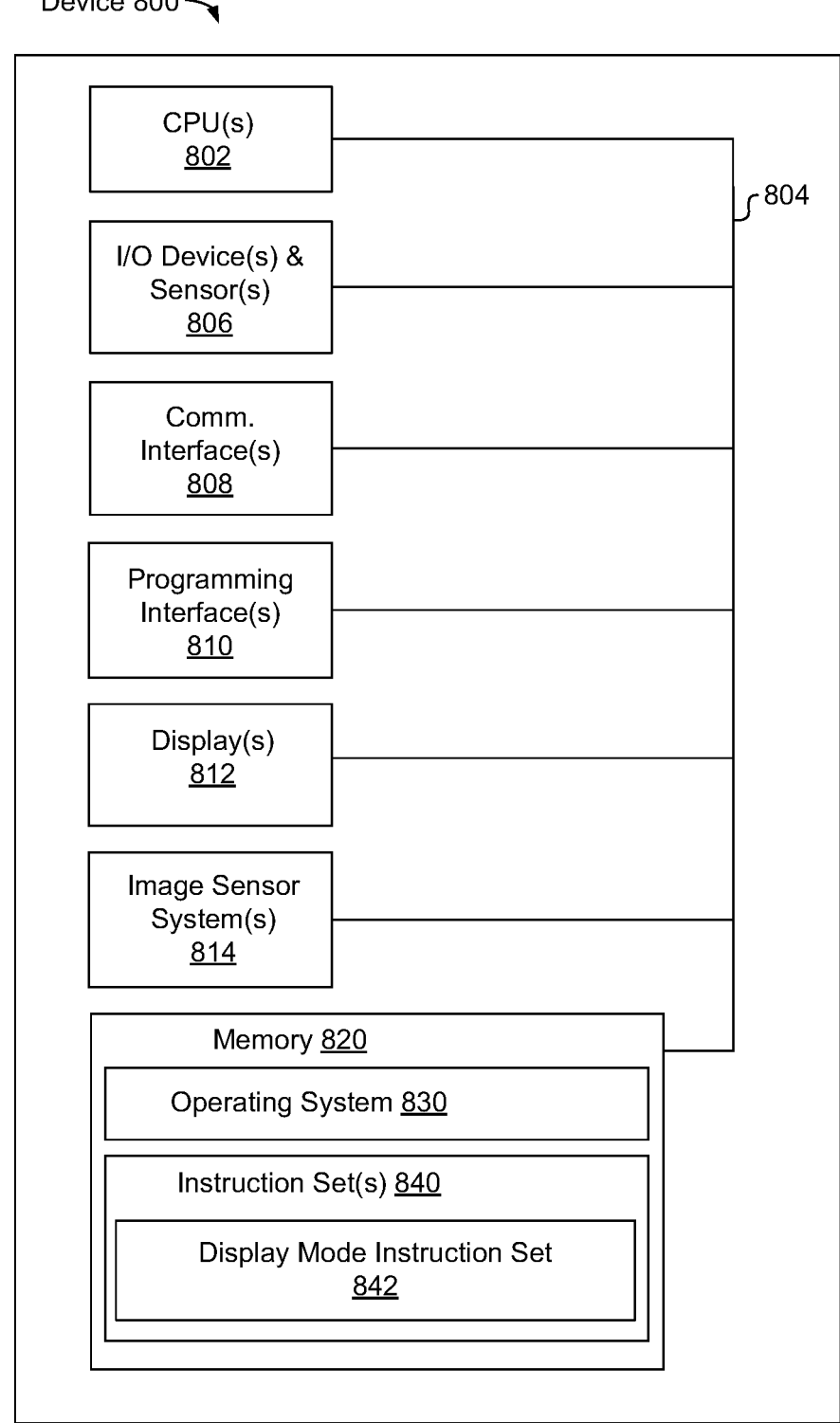
FIG. 8 illustrates an exemplary device configuration in accordance with some implementations.

FIG. 8 is a block diagram of an example of a device 800 (e.g., HMD 105 and/or mobile device 110 of FIG. 1) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more AR/VR displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present the experience to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. For example, the device 800 includes a single display. In another example, the device 800 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data including at least a portion of the processes and techniques described herein.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium. In some implementations, the memory 820 or the non-transitory computer readable storage medium of the memory 820 stores the following programs, modules and data structures, or a subset thereof including an optional operating system 830 and one or more instruction set(s) 840.

The operating system 830 includes procedures for handling various basic system services and for performing hardware dependent tasks. In some implementations, the instruction set(s) 840 are configured to manage and coordinate one or more experiences for one or more users (e.g., a single experience for one or more users, or multiple experiences for respective groups of one or more users). The instruction set(s) 840 include a display mode instruction set 842 configured with instructions executable by a processor to enable a display mode enhanced for pass-through viewing of input controls provided by another device as described herein. In some implementations, multiple devices (e.g., a mobile device and an HMD) are each configured with display mode adjustment instructions sets and communicate with one another to provide input controls (e.g., on the mobile device) and pass-through views of a physical environment including the displayed input controls (e.g., on the HMD) as described herein.

Although these elements are shown as residing on a single device (e.g., HMD 105), it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., instruction set(s) 840) shown separately in FIG. 8 could be implemented in a single module and the various functions of single functional blocks (e.g., instruction sets) could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   at a first electronic device having a processor and a first display:
      displaying a user interface of a second electronic device within a view of a three-dimensional (3D) environment via the first display, the 3D environment based at least in part on pass-through video of a physical environment;
      detecting that the second electronic device is available to receive input for the user interface via one or more input controls displayed on a second display of the second electronic device;
      in accordance with said detecting that the second electronic device is available to receive input for the user interface, transmitting a notification to the second electronic device, the notification indicating a first display mode for displaying the one or more input controls in an augmented format on the second display of the second electronic device; and
      receiving data corresponding to input received at the second electronic device, wherein the second electronic device displays said one or more input controls on the second display based on the first display mode and receives the input via said one or more input controls, wherein said one or more input controls displayed in the augmented format on said second display are visible via the passthrough video displayed via the first display.

2. The method of claim 1, wherein the first display mode differs from a second display mode available on the second electronic device, wherein:
   the first display mode corresponds to viewing the second display via pass-through video; and the second display mode corresponds to viewing the second display directly.

3. The method of claim 1 further comprising:
   determining a position of the second electronic device in the 3D environment; and
   providing augmented content associated with the one or more input controls in the view based on the position of the second electronic device.

4. The method of claim 3 further comprising:
   detecting a predetermined layout of the one or more input controls with respect to the second electronic device in the 3D environment, wherein said providing said augmented content is further based on the predetermined layout.

5. The method of claim 3, wherein the augmented content comprises a 3D representation corresponding to one of the one or more input controls.

6. The method of claim 3, wherein the augmented content comprises a 3D representation of auto-correct content, auto-fill content, or a virtual key touch bar.

7. The method of claim 3, wherein the augmented content comprises spatialized audio corresponding to input events on the second display.

8. The method of claim 1, wherein said detecting that the second electronic device is available to receive input comprises determining the user interface comprises content associated with an input modality.

9. The method of claim 8, wherein the input modality is a keyboard input modality.

10. The method of claim 1, wherein said detecting that the second electronic device is available to receive input comprises determining a gaze corresponding to an element of the user interface.

11. The method of claim 10, wherein the element of the user interface is associated with an input modality.

12. The method of claim 1, wherein said detecting that the second electronic device is available to receive input comprises determining a gaze corresponding to an element of the second electronic device.

13. The method of claim 1, wherein said detecting that the second electronic device is available to receive input comprises determining a distance of the second electronic device relative to the first electronic device.

14. The method of claim 1, wherein the first display mode comprises a size attribute for the one or more input controls.

15. The method of claim 14, wherein the size attribute comprises a minimum size attribute based on a characteristic of the first electronic device.

16. The method of claim 1, wherein the first display mode is based on a distance of the second electronic device relative to the first electronic device.

17. The method of claim 1, wherein the first display mode provides a minimum character size or minimum character resolution.

18. The method of claim 1, wherein the first display mode is based on a lighting of the physical environment.

19. The method of claim 1, wherein the second electronic device automatically displays the one or more input controls in response to the notification.

20. The method of claim 1, wherein the second electronic device displays a selectable element based on the notification, wherein the one or more input controls are displayed based on selection of the element.

21. The method of claim 1, wherein the first electronic device is a head-mounted device and the second electronic device is a mobile device.

22. The method of claim 1, wherein the first electronic device is a head-mounted device and the second electronic device is a tablet device.

23. A first electronic device comprising:

a non-transitory computer-readable storage medium; and one or more processors coupled to the non-transitory computer-readable storage medium, wherein the non-transitory computer-readable storage medium comprises program instructions that, when executed on the one or more processors, cause the first electronic device to perform operations comprising:

displaying a user interface of a second electronic device within a view of a three-dimensional (3D) environment via the first display, the 3D environment based at least in part on pass-through video of a physical environment;

detecting that the second electronic device is available to receive input for the user interface via one or more input controls displayed on a second display of the second electronic device;

in accordance with said detecting that the second electronic device is available to receive input for the user interface, transmitting a notification to the second electronic device, the notification indicating a first display mode for displaying the one or more input controls in an augmented format on the second display of the second electronic device; and receiving data corresponding to input received at the second electronic device, wherein the second electronic device displays said one or more input controls on the second display based on the first display mode and receives the input via said one or more input controls, wherein said one or more input controls displayed in the augmented format on said second display are visible via the passthrough video displayed via the first display.

24. A non-transitory computer-readable storage medium, storing program instructions executable by one or more processors to perform operations comprising:

at a first electronic device having the one or more processors and a first display:

displaying a user interface of a second electronic device within a view of a three-dimensional (3D) environment via the first display, the 3D environment based at least in part on pass-through video of a physical environment;

detecting that the second electronic device is available to receive input for the user interface via one or more input controls displayed on a second display of the second electronic device;

in accordance with said detecting that the second electronic device is available to receive input for the user interface, transmitting a notification to the second electronic device, the notification indicating a first display mode for displaying the one or more input controls in an augmented format on the second display of the second electronic device; and receiving data corresponding to input received at the second electronic device, wherein the second electronic device displays said one or more input controls on the second display based on the first display mode and receives the input via said one or more input controls, wherein said one or more input controls displayed in the augmented format on said second display are visible via the passthrough video displayed via the first display.

\* \* \* \* \*